United States Patent
Goins, Jr. et al.

[15] 3,707,192
[45] Dec. 26, 1972

[54] TWO-STAGE INJECTION OF ACID-PRODUCING CHEMICALS FOR STIMULATING WELLS

[72] Inventors: William C. Goins, Jr.; Bruce B. McGlothlin, both of Houston, Tex.

[73] Assignee: Gulf Research & Development Company, Pittsburgh, Pa.

[22] Filed: Dec. 28, 1970

[21] Appl. No.: 102,105

[52] U.S. Cl. .................... 166/300, 166/307, 166/308
[51] Int. Cl. ........................ E21b 43/26, E21b 43/27
[58] Field of Search......166/300, 308, 307, 270, 271, 166/281–283

[56] References Cited

UNITED STATES PATENTS

| | | | |
|---|---|---|---|
| 3,157,232 | 11/1964 | Ramos et al. | 166/307 X |
| 3,543,856 | 12/1970 | Knox et al. | 166/307 X |
| 3,455,388 | 7/1969 | Huitt | 166/308 X |
| 3,374,835 | 3/1968 | Knox | 166/307 X |
| 3,500,929 | 3/1970 | Eilers et al. | 166/308 X |

*Primary Examiner*—Stephen J. Novosad
*Attorney*—Meyer Neishloss, Deane E. Keith and Paul L. Tillson

[57] ABSTRACT

The flow capacity of a subsurface formation penetrated by a well is increased by fracturing the formation, extending the fracture from the well outward into the formation, depositing solid particles of a first reactant the faces of the fracture, and displacing a second reactant into the fracture to react with the first reactant. The reaction product of the two reactants is an acid that will attach the formation and thereby increase the width of the fracture. Reactants that can be used are ammonium salts and aldehydes that react to form acids. Preferred reactants for carbonate formations are ammonium chloride and formaldehyde. Preferred reactants for sandstone formations are formaldehyde and mixtures of ammonium chloride and ammonium fluoride.

13 Claims, No Drawings

TWO-STAGE INJECTION OF ACID-PRODUCING CHEMICALS FOR STIMULATING WELLS

This invention relates to the treatment of underground formations, and more particularly to the stimulation of production from, or increasing the injectivity of, such formations by an improved fracture acidizing treatment.

Many oil and gas reservoirs are limestone, dolomitic or sandstone formations of low permeability. Although the formations may contain substantial quantities of oil or gas, production rates from them are low because of the resistance of the formation to flow of formation fluids from areas of the formation at a substantial distance from wells penetrating the formation. One method that has been used extensively in an effort to stimulate production from formations of low permeability has been to pump acid down the well and displace it into the formation to dissolve a part of the formation and create channels of increased fluid conductivity in the formation. Hydrochloric acid is ordinarily used in acidizing limestone or dolomite formations and mixtures of hydrochloric and hydrofluoric acid in acidizing sandstone formations. It has been found that unless the acid is pumped at a rate that will create fractures in the formation or there are naturally occurring fractures in the formation, the acid mostly reacts locally and may have little effect on the productivity of the well.

The presence of fractures extending from the well into the surrounding formations does not necessarily greatly increase the amount of acid that reaches substantial distances from the well before reacting with the carbonate formation. One method that has been used in an effort to acidize fractures more effectively has been to coat the faces of the fractures with a material such as a gel that will be destroyed by acid before acid is displaced into the fracture. It has been found that the coating is only partially effective because the coating on that portion of the fracture closest to the well is the first to be contacted with acid and destroyed. Acid subsequently displaced into the fracture passes in contact with the exposed surface of the formation close to the well and is largely spent before the acid can reach the outer parts of the fracture. Sometimes fluid-loss reducing additives such as fine silica flour are added to control leakoff, but the acid quickly seeps through and reacts to form channels near the borehole so that much of the acid is lost before reaching the outer limits of the fracture.

The difficulties in acidizing fractures at substantial distances from the well through which acid is injected are aggravated in hot carbonate formations. Because of the high rate of reaction at the high temperatures existing in such formations, the acid treatment methods heretofore available have resulted in little more than borehole enlargement. The high temperatures existing in hot carbonate reservoirs also aggravate the problem of inhibiting hydrochloric acid to prevent excessive corrosion by the acid of the casing and tubing in a well. One method that has been used to partially overcome these difficulties caused by the high temperatures is to pump a large volume of water ahead of the acid to cool the tubing and fracture faces; however, this procedure is not totally dependable and it is not desirable to pump large quantities of water into productive formations, especially not into gas reservoirs.

This invention relates to a method of increasing the conductivity of a subsurface formation to a well in which the formation is fractured and a slurry of reactant particles is displaced down the well and into the fracture to coat the faces of the fracture for a desired radial distance from the well. The reactant should have a very low solubility in the liquid phase of the slurry to minimize the amount of reactant dissolved and carried into the formation with liquid leaking through the faces of the fracture. A non-acidic fluid reactant that will react with the reactant particles to form an acid capable of dissolving constituents of the formation is displaced into the fracture and the well shut in for a period adequate to allow formation of the acid and dissolution of formation at the surface of the fracture by the acid formed. In one embodiment of this invention, the reactant coating the face of the fracture may be a mixture of two or more solids that will react when an activating material, usually water, contacts the two solids and enables them to react with each other. One of the reactant materials is an ammonium salt and the other a water-soluble aldehyde. In the preferred embodiment of this invention, the formation treated is a limestone or dolomite formation and the ammonium salt is of an acid that forms a water-soluble salt of calcium.

In the process of this invention, a well is drilled in the conventional manner into the subsurface formation to be treated and can be completed in the usual manner such as with an open hole through the formation or with casing through that formation perforated by suitable means such as shaped charges. A fracture is then made to extend from the well outwardly into the formation for the desired distance. The fracture can be made by a conventional fracturing technique in which a suitable fracturing liquid is displaced down the well at a rate causing the pressure on the liquid to increase until the formation breaks down. Breakdown of the formation is indicated by a drop in the pressure on the liquid in the well. Liquids used in the fracturing may contain a material that will reduce the leakoff of liquid into the formation and thereby reduce the pumping rate required to build the pressure to a level high enough to cause breakdown of the formation. Gelling materials that increase the viscosity of the liquid are frequently used in fracturing liquids. If the fracturing liquid is an oil such as diesel oil, kerosene or crude oil, suitable gelling agents are aluminum naphthenate and mixtures thereof with aluminum oleate, hydroxy aluminum soaps of fatty acids and aluminum and other metal soaps of fatty acids derived from oils such as coconut oil, peanut oil and the like. If an aqueous fracturing liquid is used, natural gums, as for example, karaya, batu or guar gum can be used to increase the viscosity of the fracturing liquid.

Another type of material for reducing leakoff of fracturing liquid into the formation is finely divided solid particles, such as silica flour. The finely divided solid particles filter out at the surface of the formation to form an impermeable coating that seals the face of the formation. Other additives for reducing fluid loss can be used. A suitable fluid-loss additive for use in oil-base fracturing liquids is described in U. S. Pat. No. 2,779,735. If the formation to be treated has a very low permeability, it may not be necessary to add fluid-loss reducing additives to the fracturing liquid, and untreated liquids such as diesel oil, crude oil or water can be used as fracturing liquids. No attempt has been made to make an all-inclusive list of fracturing liquids because the particular method of initiating the fracture is not a part of this invention.

After the fracture has been initiated, it is extended for the desired distance from the well by continued displacement of liquid down the well and into the fracture at a rate faster than the liquid can leak off through the surface of the fracture. Although the fracture can be extended by displacing fracturing liquid into the fracture in the conventional manner, it is preferred that the liquid used to extend the fracture contain finely divided particles of the solid reactant to accomplish the desired placement of the solid reactant and extension of the fracture in a single step. As the fracture is extended, the solid reactant particles are filtered from liquid leaking through the faces of the fracture and coat the faces of the fracture from the well to the outer extremity of the fracture. If the solid reactant particles will not satisfactorily control the fluid leakoff through the fracture faces, a fluid-loss control agent may be added to this fluid.

After the fracture has been extended for the desired distance and the first reactant placed in the fracture, a fluid, ordinarily a liquid, containing a second reactant, and, if desired for the particular job, a fluid-loss agent, is displaced into the fracture, and the well is shut in. The two reactant materials react with one another to produce acid over the full radial extent of the fracture. That acid dissolves portions of the formation and thereby increases the width of the fracture. Although the process of this invention releases acid to dissolve the formation over the full radial extent of the fracture, the dissolution of the formation is ordinarily not uniform. Those portions of the fracture faces that are not attacked or only slightly attacked serve as islands or pillars that hold the fracture open. After shutting in for a period adequate to substantially complete the reactions, the pressure on the well is released. Any gas produced by the reaction or the action of the acid on the formation aids in cleaning the well.

This invention is of greatest utility in the treatment of carbonate formations, that is, formations containing substantial amounts of limestone and dolomite. The reactants used should produce an acid that forms a soluble salt of calcium. Ammonium salts can be displaced into the fracture for reaction with water-soluble aldehydes to form the acid. Ordinarily, a slurry of the ammonium salt in an oil or a saturated brine is pumped down the well and displaced into the fracture to deposit the ammonium salt on the faces of the fracture and is followed by an aqueous solution containing 2 percent to 44 percent by weight of the aldehyde that supplies the water required for the acid-forming reactions indicated by the equations:

$$6HCHO + 4NH_4Cl \rightarrow C_6H_{12}N_4 + 4HCl + 6H_2O$$

$$NH_4Cl + 2HCHO \rightarrow CH_3NH_2HCl + HCOOH$$

Ammonium salts that can be used are ammonium acetate, ammonium chloride, ammonium formate, and ammonium nitrate. Suitable aldehydes are formaldehyde and acetaldehyde. Polymeric forms of formaldehyde such as trioxane or paraformaldehyde can be used as well as the monomer. Because of the effectiveness of the reaction products in dissolving calcium carbonate formations and the cost and availability of the reactants, the preferred reactants are ammonium chloride and formaldehyde. Those reactants are also advantageous in producing amines that inhibit corrosion of well tubing and casing.

In a typical procedure using this invention to increase the productivity of a limestone formation at a depth of 15,000 feet, a fracture is created in the reservoir by pumping down a well into the formation that is to be treated 10,000 gallons of water containing 100 pounds of friction-reducing gum and 200 pounds of silica flour fluid-loss reducing additive at a rate of 30 barrels per minute. The pressure on the liquid pumped down the well increases to cause breakdown of the formation. While maintaining the same pumping rate, the aqueous fracturing fluid is followed with 10,000 gallons of No. 2 diesel oil in which 5,000 pounds of smaller than 170 mesh ammonium chloride and 50 pounds of a fluid-loss reducing additive, such as Adomite Mark II, a commercial fluid-loss reducing additive sold by Nalco Chemical Company, are dispersed.

The suspension of ammonium chloride in diesel oil is followed at the same pumping rate by 5,000 gallons of an aqueous solution containing 16,800 pounds of formaldehyde and 4,550 pounds of methanol to prevent polymerization of the formaldehyde. The aqueous solution of formaldehyde also contains 250 pounds of silica flour fluid-loss reducing additive. The formaldehyde solution is followed by a volume of sodium chloride brine calculated to displace most of the formaldehyde solution into the formation but to leave a small amount, such as two barrels, of the formaldehyde solution in the well. After displacement of the sodium chloride brine into the well, the well is closed in for about 12 hours and then placed on production.

In another embodiment of this invention, the acid-forming reaction can be made to proceed in the fracture by displacing two solids, for example an ammonium salt and paraformaldehyde, simultaneously into the fracture in a suspension in an oil such as diesel oil and following that suspension with water. The paraformaldehyde then reacts with the ammonium chloride to produce the acid necessary for treatment of the carbonate formation. If there is substantial water in the formation, the displacement of water into the formation can be eliminated from the procedure and the well shut in. Migration of water into the fracture will allow the acid-forming reaction to proceed.

It is not essential to the embodiments of the invention described above that the ammonium chloride be introduced into the fracture in the form of solid particles if the other reactant is in the form of solid particles. For example, finely divided paraformaldehyde may be suspended in an oil and displaced into the fracture and the oil followed with an aqueous solution of the ammonium salt. The reaction produces formic acid which attacks the carbonate formation.

This invention has been described for the treatment of carbonate formations, but it is not limited to use on such formations. For example, sandstone formations can be similarly treated, but the preferred reactants for sandstone formations are those that will produce hydrofluoric acid. For example, a suspension of a mixture of ammonium fluoride and ammonium chloride in diesel oil is displaced into the fracture to coat the faces of the fracture, and is followed by an aqueous solution of formaldehyde which reacts to form a mixture of hydrochloride and hydrofluoric acid. The hydrochloric acid reduces the amount of precipitation of insoluble calcium fluoride, and the hydrofluoric acid dissolves silica in the sandstone formation to increase the productivity of the formation by widening the fracture. Ammonium bifluoride can be used in place of ammonium fluoride in the mixture with ammonium chloride.

It is important that the acid formed by reaction of the solid reactant and the fluid reactant react with calcium carbonate of the carbonate formation to form soluble reaction products. An acid such as sulfuric acid is of little value in acid treating carbonate formations because the insoluble calcium sulfate formed, blocks flow of additional acid into contact with the formation.

It is also important that the fluid reactant displaced into the well does not react in substantial amounts direct with the formation. Otherwise the reactant would be consumed before it could reach the outer parts of the fracture to react with the solid reactant deposited in the fracture.

It is an important advantage of this invention that no acid is displaced down the tubing. The acid that attacks the faces of the fracture is not formed until the two reactants come in contact with each other in the fracture. Corrosion of well tubing and casing is thereby minimized. Formation of the acid in the fracture is of primary importance in allowing effective widening of the fracture throughout its full radial extent, but also is advantageous in reducing corrosion of the well tubing and casing. The reduction of corrosion is especially important in treating deep, hot formations where the high temperature hinders inhibition of the acid.

We claim:

1. A method of treating fractured subsurface formations penetrated by a well to increase the flow capacity thereof comprising displacing down the well and into the fracture a suspension of particles of a first reactant in a liquid to deposit the particles in the fracture for a substantial distance from the well, and thereafter introducing a second reactant into the fracture, said second reactant being adapted to react with the first reactant under conditions existing in the fracture to produce as a reaction product an acid capable of reacting with at least a portion of the formation to produce a soluble salt.

2. A method as set forth in claim 1 in which the first reactant is an ammonium salt and the second reactant is a water-soluble aldehyde.

3. A method as set forth in claim 2 in which the water-soluble aldehyde is formaldehyde.

4. A method as set forth in claim 1 in which the first reactant is an ammonium salt selected from the group consisting of ammonium chloride, ammonium formate, ammonium nitrate and ammonium fluoride, and the second reactant is an aqueous solution of formaldehyde containing 2 percent to 44 percent by weight formaldehyde.

5. A method as set forth in claim 1 in which the first reactant is deposited in the fracture by suspending the reactant in nonaqueous liquid and displacing the resultant suspension into the fracture, and the second reactant is an aqueous solution of formaldehyde.

6. A method as set forth in claim 5 in which the subsurface formation is a carbonate formation, the first reactant is ammonium chloride, and the nonaqueous liquid is a hydrocarbon oil.

7. A method of treating a subsurface formation penetrated by a well to increase the flow capacity of the formation to the well comprising pumping a liquid down the well and increasing the pressure thereon to fracture the formation, displacing a liquid having solid particles of a first reactant suspended therein down the well and into the fracture at a rate and for a period to extend the fracture for a desired distance from the well and deposit the first reactant in the fracture, thereafter displacing a second reactant down the well and into the fracture, the first and second reactants being adapted to react with one another and form as a reaction product an acid capable of reacting with at least a portion of the formation to form a soluble salt.

8. A method as set forth in claim 7 in which the first reactant is an ammonium salt selected from the group consisting of ammonium chloride, ammonium fluoride, ammonium formate and ammonium nitrate, the liquid in which the ammonium salt is displaced s a hydrocarbon oil, and the second reactant is a water-soluble aldehyde in aqueous solution.

9. A method as set forth in claim 7 in which the first reactant is an ammonium salt selected from the group consisting of ammonium chloride, ammonium fluoride, ammonium formate and ammonium nitrate, the reactant in which the ammonium salt is suspended is a saturated brine, and the second reactant is a water-soluble aldehyde.

10. A method as set forth in claim 7 in which the first reactant is paraformaldehyde, the liquid in which the paraformaldehyde is suspended is a hydrocarbon oil, and the second reactant is an aqueous solution of ammonium chloride.

11. A method of treating a subsurface formation penetrated by a well to increase the conductivity of the formation to the well comprising fracturing the formation, displacing into the fracture a slurry containing a mixture of solid particles of paraformaldehyde and an ammonium salt selected from the group consisting of ammonium chloride, ammonium fluoride, ammonium formate and ammonium nitrate in a hydrocarbon oil to deposit said mixture of solid particles in the fracture, and then displacing water into the fracture.

12. A method of treating a subsurface formation penetrated by a well to increase the flow capacity of the formation to the well comprising pumping water containing a fluid-loss reducing additive down the well at a rate to cause an increase in pressure in the well and fracturing of the formation, following the water with a slurry of a hydrocarbon oil having suspended therein ammonium chloride and a fluid-loss reducing additive at a rate to extend the fracture from the well and deposit ammonium chloride in the fracture, following the slurry of ammonium chloride in oil with an aqueous solution of formaldehyde, and closing in the well for a period to allow the formaldehyde and ammonium chloride to react and the resultant acidic reaction product to react with at least a portion of the formation to form a water-soluble salt.

13. A method of treating a fractured sandstone formation penetrated by a well to increase the flow capacity of the fracture comprising displacing down the well and into the fracture a slurry in a hydrocarbon oil of a compound selected from the group consisting of ammonium fluoride and ammonium bifluoride, and thereafter displacing down the well and into the fracture an aqueous solution of formaldehyde.

* * * * *